US012548540B2

(12) United States Patent
Finlayson et al.

(10) Patent No.: US 12,548,540 B2
(45) Date of Patent: Feb. 10, 2026

(54) ACOUSTIC ABSORBING STRUCTURES

(71) Applicant: BAE SYSTEMS PLC, London (GB)

(72) Inventors: Ewan David Finlayson, Exeter (GB); Alastair Paul Hibbins, Exeter (GB); Sir John Roy Sambles, Exeter (GB); Gwyn Richards, Preston (GB); David Patience, Frimley (GB)

(73) Assignee: BAE SYSTEMS PLC, London (GB)

( * ) Notice: Subject to any disclaimer, the term of this patent is extended or adjusted under 35 U.S.C. 154(b) by 201 days.

(21) Appl. No.: 18/285,041

(22) PCT Filed: Mar. 23, 2022

(86) PCT No.: PCT/GB2022/050724
§ 371 (c)(1),
(2) Date: Sep. 29, 2023

(87) PCT Pub. No.: WO2022/208052
PCT Pub. Date: Oct. 6, 2022

(65) Prior Publication Data

US 2024/0379086 A1 Nov. 14, 2024

(30) Foreign Application Priority Data

Mar. 29, 2021 (EP) .................................... 21275034
Mar. 29, 2021 (GB) .................................... 2104412

(51) Int. Cl.
*G10K 11/162* (2006.01)
*E04B 1/82* (2006.01)
(Continued)

(52) U.S. Cl.
CPC .................................. *G10K 11/162* (2013.01)

(58) Field of Classification Search
CPC ...... G10K 11/02; G10K 11/16; G10K 11/162; G10K 11/168; G10K 11/172; H04R 1/288;
(Continued)

(56) References Cited

U.S. PATENT DOCUMENTS 1,554,179 A * 9/1925 Trader ...................... E04B 1/86 D25/155
1,738,654 A * 12/1929 James ...................... E04B 1/82 181/291
(Continued)

FOREIGN PATENT DOCUMENTS

CN 2660649 Y 12/2004
CN 201265144 Y 7/2009
(Continued)

OTHER PUBLICATIONS

International Search Report and Written Opinion dated May 25, 2022 issued in PCT/GB2022/050724.
(Continued)

*Primary Examiner* — Edgardo San Martin
(74) *Attorney, Agent, or Firm* — Scully, Scott, Murphy & Presser, P.C.

(57) ABSTRACT

In some examples, an acoustic absorbing structure comprises a surface comprising an array of apertures, each aperture defining an opening for a corresponding channel, each channel forming a non-resonant acoustic attenuation structure with an axially decreasing cross-section over at least a portion of the length of the channel.

20 Claims, 6 Drawing Sheets

(51) Int. Cl.
*E04B 1/84* (2006.01)
*F02C 7/045* (2006.01)
*F02K 1/34* (2006.01)
*G10K 11/16* (2006.01)

(58) Field of Classification Search
CPC ...... H04R 1/2869; H04R 1/28; H04R 1/2803; H04R 1/2884; H04R 1/2888; E04B 1/84; E04B 1/82; E04B 1/8209; E04B 1/86; E04B 2001/8485; E04B 2001/8428; E04B 2001/848; E04B 2001/8495; F02C 7/045; F02K 1/34; F02K 1/827
See application file for complete search history.

(56) References Cited

U.S. PATENT DOCUMENTS

| | | | | |
|---|---|---|---|---|
| 2,062,478 | A * | 12/1936 | Riesz | G01H 3/00 181/198 |
| 2,293,181 | A * | 8/1942 | Terman | G10K 11/16 181/166 |
| 3,734,234 | A | 5/1973 | Wirt | |
| 3,819,007 | A * | 6/1974 | Wirt | E04B 1/86 428/116 |
| 3,887,031 | A * | 6/1975 | Wirt | G10K 11/172 181/292 |
| 4,232,762 | A | 11/1980 | Bschorr | |
| 6,977,109 | B1 * | 12/2005 | Wood | G10K 11/16 181/294 |
| 7,623,670 | B2 * | 11/2009 | Hoefler | H04R 1/345 381/338 |
| 7,819,224 | B2 * | 10/2010 | Borchers | F01D 25/30 181/292 |
| 8,689,936 | B2 * | 4/2014 | Richter | G10K 11/172 52/145 |
| 8,783,412 | B2 * | 7/2014 | Todorovic | F02K 1/827 244/53 B |
| 8,997,923 | B2 * | 4/2015 | Ichihashi | F02C 7/045 181/292 |
| 9,068,345 | B2 * | 6/2015 | Ichihashi | G10K 11/172 |
| 9,303,588 | B2 * | 4/2016 | Pongratz | F02C 7/24 |
| 9,759,447 | B1 * | 9/2017 | Mathur | G10K 11/172 |
| 11,059,559 | B2 * | 7/2021 | Cedar | E04B 1/86 |
| 11,208,193 | B2 * | 12/2021 | Ravise | G10K 11/168 |
| 11,348,565 | B2 * | 5/2022 | Ravise | F02K 1/827 |
| 11,434,826 | B2 * | 9/2022 | Riou | B32B 15/20 |
| 11,686,247 | B2 * | 6/2023 | Desjoyeaux | F04D 29/665 415/119 |
| 11,715,450 | B2 * | 8/2023 | Quesada | G10K 11/168 181/284 |
| 11,812,238 | B2 * | 11/2023 | Schweiger | G10K 11/02 |
| 2015/0041247 | A1 | 2/2015 | Ichihashi | |
| 2024/0101264 | A1 * | 3/2024 | Riou | F02K 1/827 |

FOREIGN PATENT DOCUMENTS

| | | | | |
|---|---|---|---|---|
| CN | 109300464 | A | 2/2019 | |
| CN | 113954890 | A * | 1/2022 | G10K 11/172 |
| DE | 102004040112 | A1 * | 3/2005 | G10K 11/172 |
| DE | 202010009659 | U1 | 12/2010 | |
| EP | 2605238 | A2 | 6/2013 | |
| EP | 3002405 | A2 | 4/2016 | |
| EP | 3300073 | A1 | 3/2018 | |
| GB | 927865 | A | 6/1963 | |
| GB | 2290672 | A | 1/1996 | |
| GB | 2341742 | A | 3/2000 | |
| JP | S5288301 | A | 7/1977 | |
| JP | H03192897 | A | 8/1991 | |
| JP | H1041675 | A | 2/1998 | |
| JP | 2006057292 | A | 3/2006 | |
| KR | 20020011300 | A | 2/2002 | |
| WO | 1993000262 | A1 | 1/1993 | |
| WO | 1997024496 | A1 | 7/1997 | |
| WO | 2010017774 | A1 | 2/2010 | |
| WO | 2014057338 | A2 | 4/2014 | |

OTHER PUBLICATIONS

Extended EP Search Report dated Sep. 21, 2021 issued in EP 21275034.3.
GB Search Report dated Jun. 22, 2021 issued in GB 2104412.8.
Notice of Reasons for Refusal dated Jan. 14, 2025 received in Japanese Patent Application No. 2023-560113.

* cited by examiner

ACOUSTIC ABSORBING STRUCTURES

TECHNICAL FIELD

Aspects relate, in general, to acoustic absorbing structures and more specifically, although not exclusively, to structures for absorption of low frequency broadband acoustic noise.

BACKGROUND

In some situations, the presence of low frequency noise can be problematic. For example, high amplitude low-frequency noise can cause fatigue to be induced on structures such as vehicular platforms (e.g., fast jet platforms) where acoustic levels high enough to damage equipment and the platform structure are typically generated in e.g., internal payload bays. Such high acoustic levels can be managed by designing the geometry of the surrounding platform structures to divert noise and to withstand the high noise levels. However, such design considerations add undesirable mass and complexity to the platform in question.

Other methods for managing the presence of undesirable low-frequency acoustic noise include the use of materials or structures to exploit resonance effects. However, these are only suitable for narrowband frequency ranges and are therefore generally unsuitable for use on or in platforms where broadband frequency control is required. Absorbers capable of broadband frequency control can be used, but they typically require spatial regions for installation that are around the same size as the wavelength corresponding to the lowest frequency of interest. That is, in order to provide a useful broadband attenuation of unwanted acoustic noise, such absorbers are typically large and bulky. Again, this adds undesirable mass, weight and cost.

SUMMARY

According to an example, there is provided an acoustic absorbing structure, comprising a surface comprising an array of apertures, each aperture defining an opening for a corresponding channel, each channel forming a non-resonant acoustic attenuation structure with an axially decreasing cross-section over at least a portion of the length of the channel. Regions of the surface between apertures are minimised whereby to reduce acoustic impedance of the surface. In an example, the apertures are polygonal (i.e. in two-dimensional cross-section). In other examples, the apertures are circular. The apertures can form a periodic or aperiodic tessellation over the surface. Broadly speaking, regions between apertures are minimised in order to present a surface to an incident sound wave which does not introduce a large mismatch in acoustic impedance, thereby leading to high levels of acoustic reflection from the surface.

In an example, a channel tapers, in an axial direction, from its opening at the surface according to a predefined tapering profile. The rate of tapering of the channel along its length can be logarithmic. The rate of tapering may be linear, or indeed follow any other suitable profile. A channel can taper to a point. A channel can taper to an opening in a side of the acoustic absorbing structure opposite the surface.

In an example, a channel defines an acoustic pathway, the length of which is longer than a dimension of the acoustic absorbing structure. A channel can be folded. That is, a channel can comprise a circuitous, sinuous or tortured profile. A channel can comprise a series of baffles arranged along its length. Each baffle can extend inwardly from an inner surface of the channel and the length and density of baffles can increase along the length of the channel.

An opening can define a contraction region between the surface of the structure and a channel. For example, a region of a channel can comprise a different tapering profile compared to the rest of the channel.

In an example, a first material can be disposed or otherwise provided within a channel, the first material having a first density presenting a first acoustic impedance. A second material can be disposed or otherwise provided within the channel, the second material having a second density presenting a second acoustic impedance. The structure can be composed of a single material with multiple regions of respective different densities.

According to an example, there is provided a platform comprising a source of low frequency acoustic noise, the platform comprising an acoustic absorbing structure as claimed in any preceding claim so configured as to absorb or attenuate low frequency acoustic noise. The acoustic absorbing structure can receive the low frequency acoustic noise from the source at a normal to the surface. This enables optimal noise attenuation. In an example, an acoustic absorbing structure may be arranged at other angles of incidence to the noise with reduced levels of attenuation. The acoustic absorbing structure may be placed in a reverberant field or open or closed cavities to reduce noise levels in those spaces.

BRIEF DESCRIPTION OF THE DRAWINGS

For a more complete understanding of the present disclosure, reference is now made, by way of example only, to the following descriptions taken in conjunction with the accompanying drawings, in which.

DESCRIPTION

Figure 1:
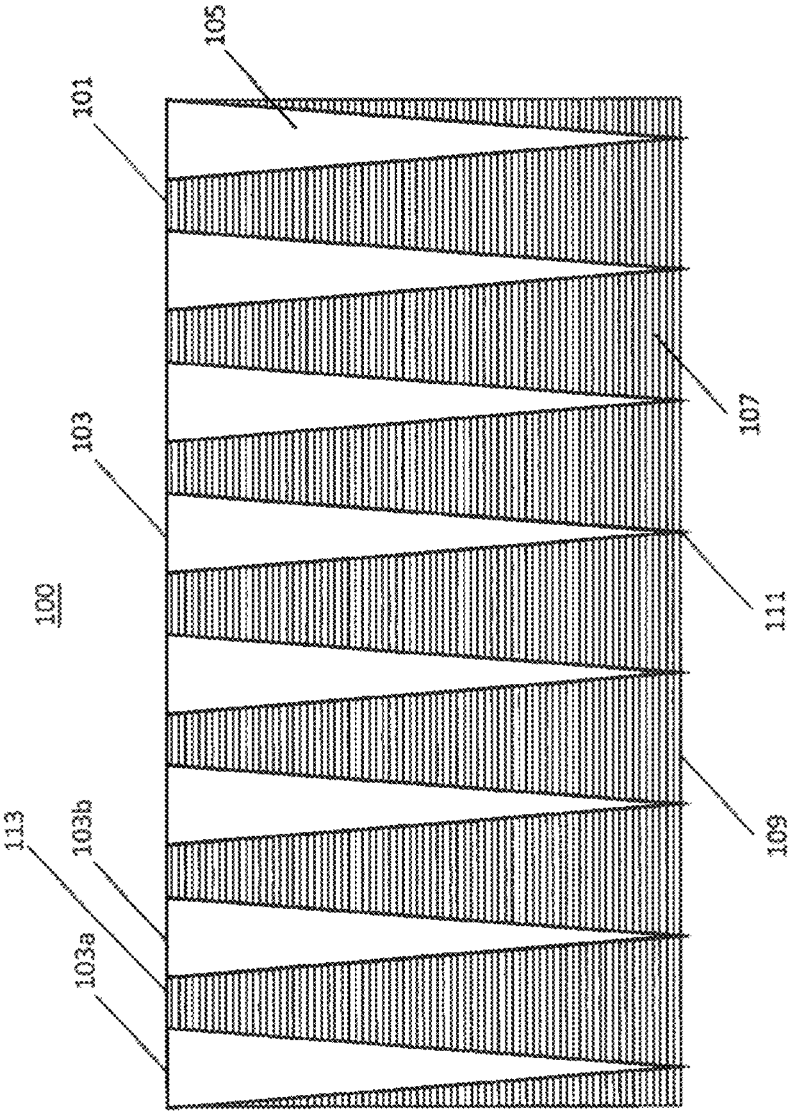
FIG. 1 is a schematic representation of an acoustic absorbing structure according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein. Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

According to an example, there is provided an acoustic absorbing or attenuation structure. The acoustic absorbing structure utilises an array of channels, each channel forming a non-resonant acoustic attenuation structure with an axially decreasing cross-section over at least a portion of the length of the channel. A surface of the acoustic absorbing structure comprises an array of apertures, with each aperture defining an opening for a corresponding channel provided in a body of the structure. In an example, each opening can be of the order of several millimetres wide, tapering to a point (or to another opening) over the length of the channel. That is, the surface comprises an array of holes that define the openings of multiple channels within the body of the acoustic absorbing structure. In an example, the channels reduce in cross-sectional area, and/or change in profile, along their length according to a tapering profile, until they terminate in a point (such as a dead end in the body) or another opening, such as an opening on the opposite side of the structure. As an acoustic wave travels down the tapered channel, which may be in the form of holes or slots, it is attenuated along the length of the channel.

FIG. 1 is a schematic representation of an acoustic absorbing structure according to an example. In the example of FIG. 1, which shows a cross-sectional view of a portion of the acoustic absorbing structure 100, a surface 101 comprises an array of apertures 103. Each aperture 103 defines an opening for a corresponding channel 105. Channels 105 are provided within a body 107 of 10 the structure 100. In an example, surface 101 and body 107 are a monolithic structure. Alternatively, surface 101 and body 107 may be composed of respective different materials, with surface 101 being adhered or otherwise fixed or deposited to or on body 107. The spacing between and the relative dimensions of elements of the structure in FIG. 1, and subsequent figures described in more detail below, has been increased/exaggerated to preserve clarity. In practice, channels are closely packed which means that the openings thereof are also closely packed, which helps to minimise reflections from the surface.

In an example, in order to prevent ingress of debris into the channels, which may be in the form of narrow holes or slots for example, the surface 101 can comprise a thin membrane, mesh or other acoustically transparent material, which may be adhered, fixed or mounted to the body. Alternatively, surface 101 can comprise a layer with protected apertures. That is, surface 101 can be a layer in which the openings for channels 105 are defined by mesh (or membrane or acoustic transparent material) portions of the surface 101, which portions can be suitably profiled to match the size and shape of the mouth of channels 105. The surface 101 layer can then be fixed to body 107.

In the example of FIG. 1, each channel 105 forms a non-resonant acoustic attenuation structure with an axially decreasing cross-section over at least a portion of the length of the channel. That is, each of the channels 105 tapers in an axial direction from its opening 103 at surface 101 to a surface 109 on the opposite side of the structure 100. In some examples, at least some of the channels 105 can taper to a point 111. In other examples, at least some of the channels 105 can taper to an opening in surface 109. The opening in surface 109 will be smaller than an opening 103 due to the decreasing size of the channel in question.

A channel 105 attenuates sound as it passes through the channel. More specifically, as an acoustic wave passes through a channel 105 it experiences viscous damping—drag is experienced at the boundaries of the channel 105, which results in conversion of the energy from the acoustic wave to heat, which is dissipated in the body 107 and within the channel itself. The decreasing channel size also reduces the speed of sound within the channel. This reduces the acoustic wavelength corresponding to a given frequency, in turn allowing a channel of a given length to accommodate and thus attenuate sound of lower frequencies than would be possible in other types of absorber (such as porous material) with the same axial length.

As the size of the channel decreases over its length, the visco-thermal damping effect also becomes more pronounced, whilst the provision of a gradual taper in the channel means that there is a gradual change in acoustic impedance tends to minimise acoustic reflections. Minimising or eliminating acoustic reflections is advantageous in order to enable an incident acoustic wave to be attenuated or absorbed fully.

In this connection, it will be apparent that surface 101 presents a discontinuity in acoustic impedance to an incident acoustic wave. However, according to an example, this is minimised by reducing the size and/or number of regions of the surface between apertures 103. That is, with reference to FIG. 1 for example, a region 113 of surface 101, which lies between two apertures 103*a* and 103*b*, presents a discontinuity in acoustic impedance to an incident acoustic wave since the body 107 will, in general, have a different acoustic impedance to, e.g., the air through which the acoustic wave is travelling. By reducing the size of the region 113, the discontinuity is reduced, thereby presenting a surface 101 that can be substantially impedance matched to the medium though which the acoustic is travelling, which in an example is most likely to be air, but which could be any number of other media, such as water and so on.

In this context, apertures may vary in size and/or shape. For example, apertures may be polygonal. Apertures can be arranged with a minimum region 113 between them, such that the region 113 represents, e.g., a thin boundary between apertures rather than a larger region of surface 101. In the case that apertures are polygonal for example, apertures may be tessellated to i) maximise the number of apertures for a given region of surface, and ii) minimise the space between apertures. Apertures may be so sized and shaped as to provide a periodic or aperiodic tessellation over the surface 101. That is, apertures may be the same or shape, at least some may comprise different shapes, and the size of apertures may vary as desired.

According to an example, the shape of an aperture can dictate the cross-sectional shape of a channel. Conversely, a given cross-sectional shape of a channel can dictate the shape and size of an aperture. For example, a circular aperture can serve as the opening of a cone shaped channel. Obviously, any number of different shapes may be selected.

For example, an aperture may be hexagonal, with a correspondingly shaped channel comprising six inner faces that taper to a point 111.

The cross-sectional shape of a channel can therefore be selected and can vary as desired and, e.g., circular, 2D slots, triangular, square, pentagonal and so on cross-sections are all suitable examples. In an example, the width of the channels is small, being of the order of, e.g., a millimetre at the opening. The tapered channel can be either closed at the opposite end or terminated in a small hole. The diameter of the exit hole will influence the acoustic performance of the system. Exit holes or dead ends of the order of, e.g., 50 microns result in good attenuation across a wide frequency range. However, larger holes could be utilised in applications where a more limited attenuation characteristic would suffice.

In an example, the shape of the channel may vary along its length. For example, the channel may start, at its opening, being hexagonal in cross-section, and this may gradually change over the length of the channel to, e.g., circular, whilst tapering. There are many different permutations for the shapes and sizes of the apertures and channels, including whether they are fixed in shape (albeit tapering), or whether the shape varies long the length of the channel. The absorption characteristics of the structure may be tuned by altering at least one of: the taper gradient (which need not be constant along the length of the slit), entrance aperture and channel length.

According to an example, the cross-sectional area of a channel varies over its length according to a tapering profile. That is, the cross-sectional area of a channel will gradually reduce along its length from the opening towards the terminal point or exit hole in line with a predetermined set of parameters. Each channel may have a different tapering profile. In an example, a tapering profile can define, e.g., a rate of taper of different regions of a channel, and a form of tapering. For example, tapering can be linear, logarithmic or based on any other suitable function. A rate of tapering may be more pronounced (i.e., higher) at a region of a channel nearer to the opening 103 than at the tail end of the channel near surface 109. Accordingly, the rate of tapering can slow or reduce along the length of the channel.

According to an example, the required lowest frequency of absorption dictates the overall length of a channel 105. For example, for absorption down to approximately 200 Hz a channel length of approximately 600 mm is required. However, as noted above, and in the context of the example shown in FIG. 1, such channel lengths result in a structure that may, in certain situations, be too large and/or heavy. Therefore, according to an example, the geometry of each channel can be folded.

Figure 2:
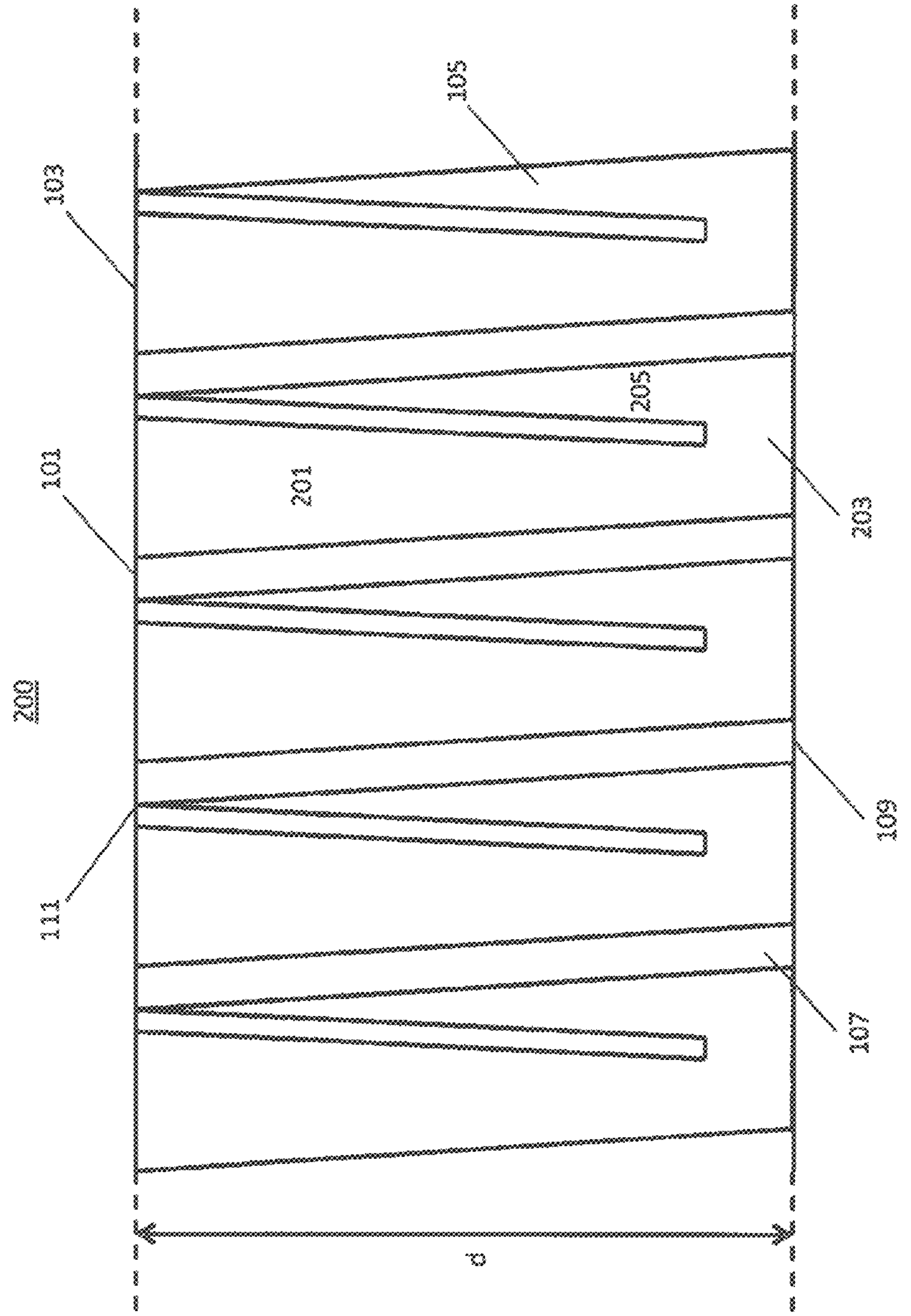
FIG. 2 is a schematic representation of an acoustic absorbing structure according to an example.

FIG. 2 is a schematic representation of an acoustic absorbing structure according to an example. In the example of FIG. 2, each channel 105 is folded to provide a convoluted or circuitous acoustic pathway. That is, each channel 105 comprises a first tapering portion 201 and a second tapering portion 205 that are joined by a portion 203. The first tapering portion 201 starts tapering from an opening 103 until it reaches portion 203. The second tapering portion 205 starts tapering from portion 203 until it reaches its terminal point 111, which may be provided in, on or just before surface 101 in the example of FIG. 2. According to an example, portion 203, which is the portion of the channel which links the portions 201 and 205 does not taper. As such, it does not introduce a discontinuity into the channels. That is, as there is no change in the cross-sectional area of the region 203, there is no change in the acoustic impedance in this region. Each region (201; 205) of a channel may have a different tapering profile associated with it, as described above. So, for example, region 201 may taper at a first rate according to a first tapering function (e.g., logarithmic), whilst region 205 may taper at a second rate according to a second tapering function (e.g., linear). The second rate of tapering may be higher or lower than the first rate. Of course, the rates and function associated with the tapering for these two regions may be the same, as desired. Furthermore, in the examples of FIGS. 1 and 2, the channel portions comprise the same cross-sectional shape. However, these regions may differ in this respect such that different regions are shaped differently from one another (e.g., region 201 may be cylindrical in nature, whilst region 205 may be rectangular in nature, and so on).

The length of the acoustic pathway of a channel 105 shown in FIG. 2 is around 2 d, where d is the thickness of the structure 200 from surface 101 to surface 109. So, for example, if d is 300 mm, the acoustic pathway is around 600 mm, which, in an example, corresponds to an acoustic pathlength capable of absorbing sound with a frequency down to around 200 Hz but in half the space of the structure depicted in FIG. 1 for example. In the example of FIG. 2, the channels 105 are folded once. However, it will be appreciated that the number of folds may be more, whereby to reduce the dimension d even further.

Figure 3:
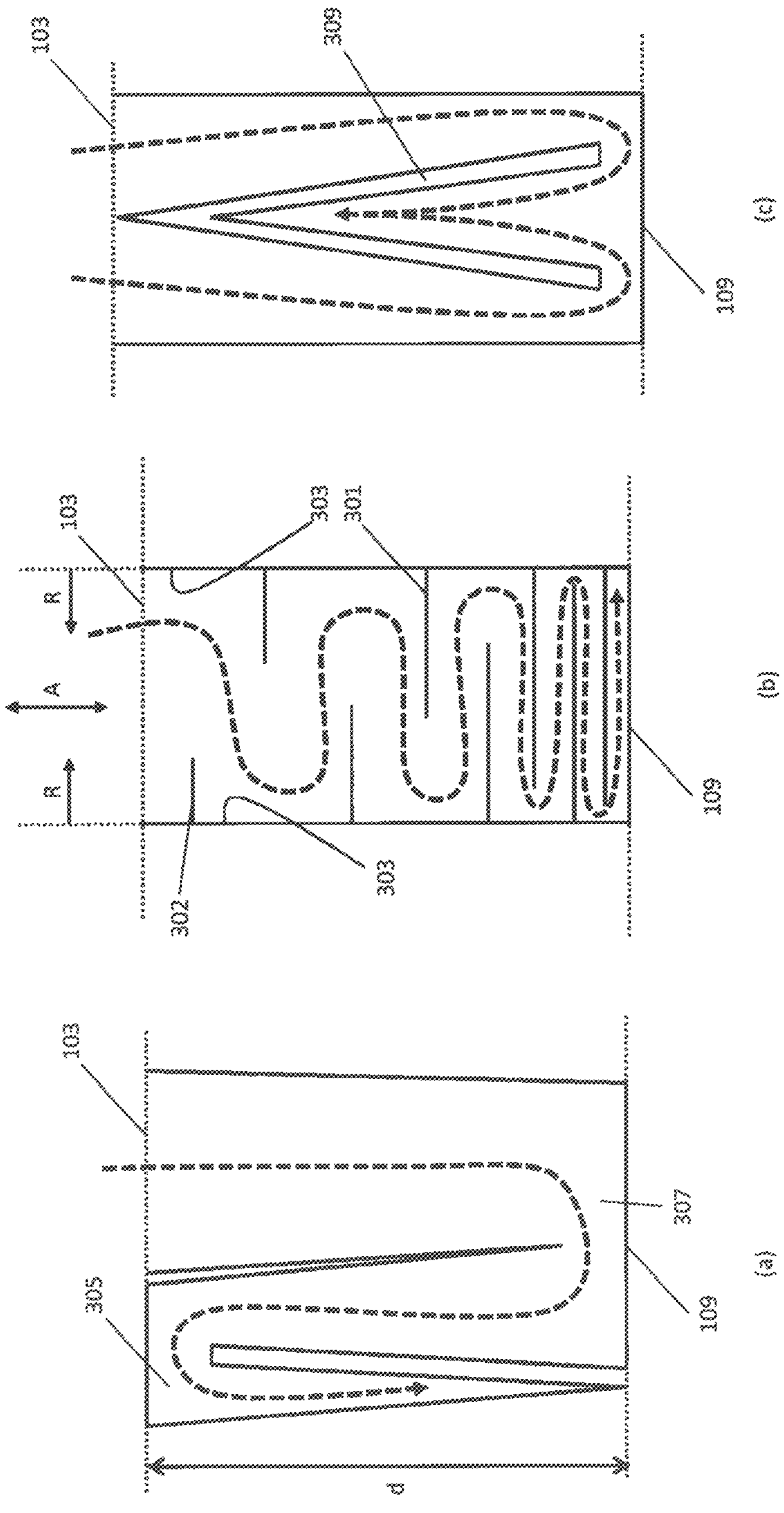
FIGS. 3*a*, 3*b* and 3*c* are schematic representations of non-resonant acoustic attenuation structures according to an example.

FIGS. 3*a* to 3*c* are schematic representations of non-resonant acoustic attenuation structures according to an example. FIG. 3*a* shows a structure that is similar to that depicted in FIG. 2. However, in the case of FIG. 3*a*, an additional fold in the channel is provided, thereby further increasing the length of the acoustic pathway (coarsely represented by the dotted arrowed line) of the channel within the available depth of the structure. Two regions (305; 307) are non-tapering regions as described above with reference to region 203 of FIG. 2. As noted above, other regions of the structure depicted in FIG. 3*a* may taper in different ways from one another. The structure of FIG. 3*a* may terminate in a hole in surface 109 or may end in a point (or other terminal structure) at or before surface 109 (or 101, depending on the number and/or nature of the folds/bends in the channel).

FIG. 3*b* is a schematic representation of another non-resonant acoustic attenuation structure according to an example. In the example of FIG. 3*b*, the channel comprises a series of baffles 301 arranged along its length. Each baffle 301 extends inwardly from an inner surface 303 of the channel, and the length and density of baffles increases along the length of the channel in a direction towards surface 109. That is, at the opening 103 end of the channel, a baffle 301 is provided that extends radially (R) into the channel. The entry baffle 302 nearest the opening 103 extends into the channel by the smallest amount compared to the rest of the baffles provided in the example of FIG. 3*b*. For example, the entry baffle 102 may extend a quarter of the way into the channel, with subsequent baffles extending into the channel by an increased degree compared to the entry baffle 302. For example, each subsequent baffle may extend into the channel by 5-25% more than the previous one. The density of baffles, i.e., the number of baffles over a given length of the channel, increases axially (A) from the opening 103 according to a predetermined value. As such, and as can be seen from FIG. 3*b*, the concentration of baffles increases as surface 109 is approached, thereby mimicking a tapering effect such as that shown in FIG. 3*a* for example. Thus, as the channel is traversed in an axial (A) direction, further baffles are provided extending radially into the channel. The length that a baffle extends into the channel increases as the axial distance from the opening 103 increases. Furthermore, the density of baffles increases as the axial distance from the opening 103 increases. The acoustic pathway is again shown by the dotted arrowed line in FIG. 3*b*.

In the example of FIG. 3*b*, relatively thin baffles are shown but alternative shapes may be utilised providing that the channel that the acoustic wave passes through gradually reduces in size in order to achieve a gradual change in the acoustic impedance and avoid undesirable step changes which will degrade the acoustic performance of the attenuator.

In the case that the channel of FIG. 3*b* is a slot, for example, baffles 301 may extend from a side wall (303) and be joined to front and rear walls of the channel (in the sense of the representation of FIG. 3*b*, front and rear walls not shown) to prevent acoustic leakage within the channel. If the channel were cylindrical, for example, baffles 301 can be in the form of annular discs that are attached to or otherwise part of the inner surface of the channel. In this case, the apertures formed by the annular baffles can be positioned at, e.g., opposite sides of successive baffles to create a snaking path as shown in FIG. 3*b* for example.

In the case of other channel shapes, the baffles can be so profiled as to match the profile of the inner wall of the channel. For example, a hexagonal channel would lead to use of hexagonally shaped baffles (with holes through the centre in order to maintain the acoustic pathway, which holes in the baffles need not be the same shape as the outer edge of the baffle—i.e., the outer edge of a baffle could be hexagonal to match the profile of a portion of a channel, whereas the hole in the baffle could be circular and so on). Similar considerations with respect to the positioning of the aperture in a baffle relative to the aperture in a succeeding and/or preceding baffle apply as noted above. While the side wall 303 of the channel proximate the opening 103 is shown to be vertical, in other embodiments it is sloped. For example, the side wall 303 in the embodiment of FIG. 3*b* may be arranged similarly to as described with reference to FIG. 2, such that the channel narrows along its length.

FIG. 3*c* is a schematic representation of another non-resonant acoustic attenuation structure according to an example. In the example of FIG. 3*c*, the channel is segmented or divided by way of a structure 309. Structure 309 has a flared component or components that extend axially in the channel and which flare in a direction from opening 103. That is, in an axial direction from opening 103, structure 309 flares whereby to present multiple acoustic pathways for an incident acoustic wave. Each acoustic pathway tapers, initially in a direction away from opening 103, and then in a direction towards opening 103, as shown in FIG. 3*c*.

The example of FIG. 3*c* is shown in cross-section. In three dimensions there are various form factors for the channel and structure 309 that could be implemented. For example, the channel could be a slit in the body of the acoustic absorbing structure, with structure 309 comprising two arms stemming from a point that flare as shown in FIG. 3*c*. Alternatively, for example, the channel could be cylindrical, in which case structure 309 could be in the form of a hollowed cone whose cross-section is as depicted in FIG. 3*c*. It will be appreciated that other geometric constructs utilising multiple acoustic pathways can be used. Furthermore, any of the examples described with reference to FIGS. 3*a*-3*c* can be combined with another.

Figure 4:
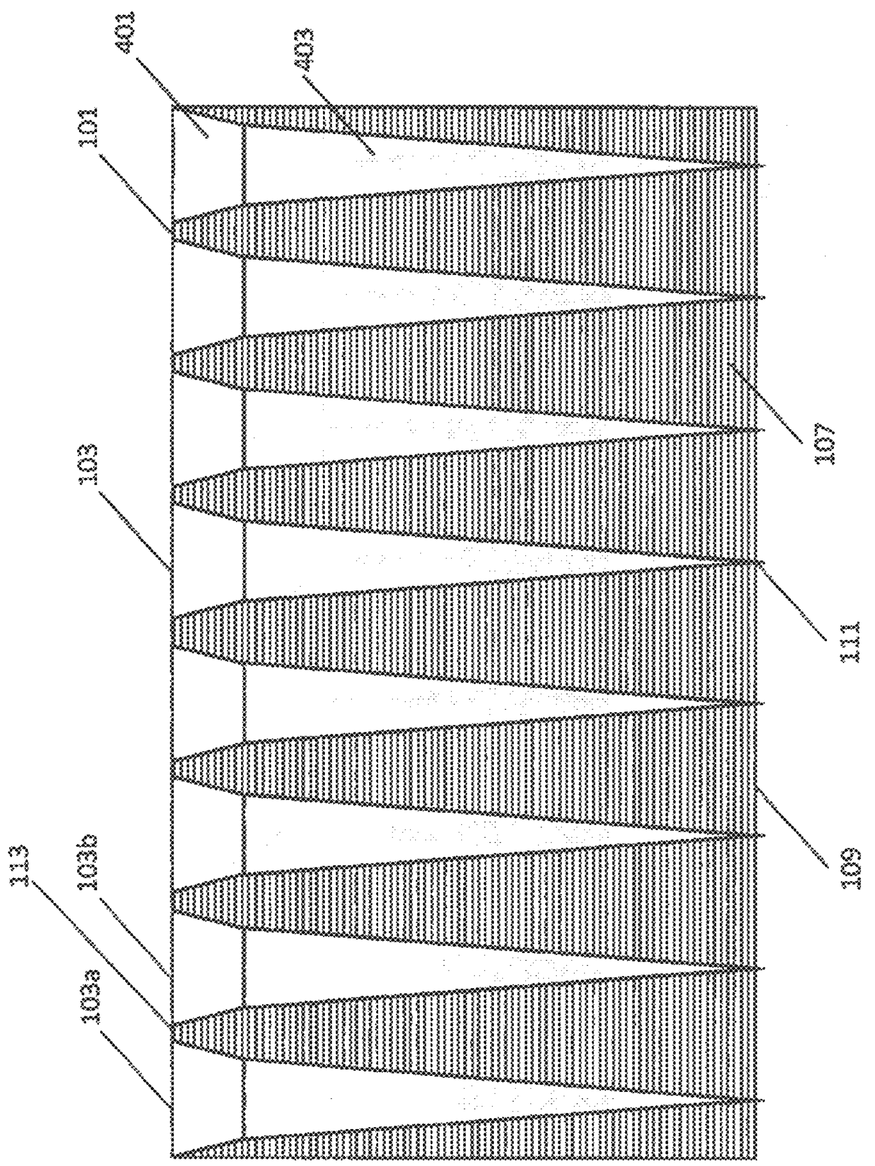
FIG. 4 is a schematic representation of an acoustic absorbing structure according to an example.

FIG. 4 is a schematic representation of an acoustic absorbing structure according to an example. The example of FIG. 4 shows an alternative (or additional) mechanism that can be used to minimise regions 113 between apertures 103. As noted, before, minimising the regions between apertures helps to avoid acoustic reflections and maximise the area for an acoustic wave to enter the non-resonant acoustic attenuation structure. In the example of FIG. 4, a relatively short contraction section 401 is provided that extends from the surface 101 to the rest of the non-resonant acoustic attenuation structure 403. The region 401 is shown as a straight surface but it will be appreciated that a curved profile (e.g., with its own tapering profile) could be used to produce a more gradual change in the acoustic impedance to further minimise reflections resulting in a better attenuation characteristic.

In the example of FIG. 4, the contraction section 401 is shorter than the tapered section 403, but where space permits the contraction section 401 could be lengthened to minimise the reflections even more. It will be appreciated that a contraction section could be combined with any of the examples described above, such as those described with reference to any one or more of FIGS. 1 to 3.

A broadband absorber/attenuator can be produced using one or more of the examples described above that is able to operate down to around at least 200 Hz with an overall thickness of around 100 mm or less.

An acoustic absorbing structure according to examples can be used in space critical applications such as aircraft and other transport applications. Other applications, where space is less critical but a small absorber is beneficial, may include, e.g., internal spaces in buildings where control of the acoustic environment is required. These may include, but are not limited to, entertainment venues such as theatres, concert halls, cinemas, recording studios and other spaces such as offices, restaurants etc.

According to an example, a channel may be defined by a cavity in the body of the acoustic absorbing structure. That is, a channel may be an opening in the body of the structure. In an example, a channel may be partially or fully filled or composed of another material (that differs from the material used for the body and/or which is not free space). For example, a channel may be partially of fully filled or composed from an aerogel or other porous material. The density of the material used to fill the channel may be varied axially and/or radially in order to alter the acoustic impedance of the channel. For example, a channel can be partially filled (from the region adjacent the surface 109 upwards towards surface 101, or vice versa) with a material such as an aerogel. The material can have a constant or varying density. For example, in the latter case, the density of the material can increase towards surface 109. As such, with a relatively lower density closer to the opening 103, the acoustic impedance mismatch between the material and, e.g., air or another material in the rest of the channel can be regulated in order to minimise reflections from the surface of the material in the channel.

Figure 5:
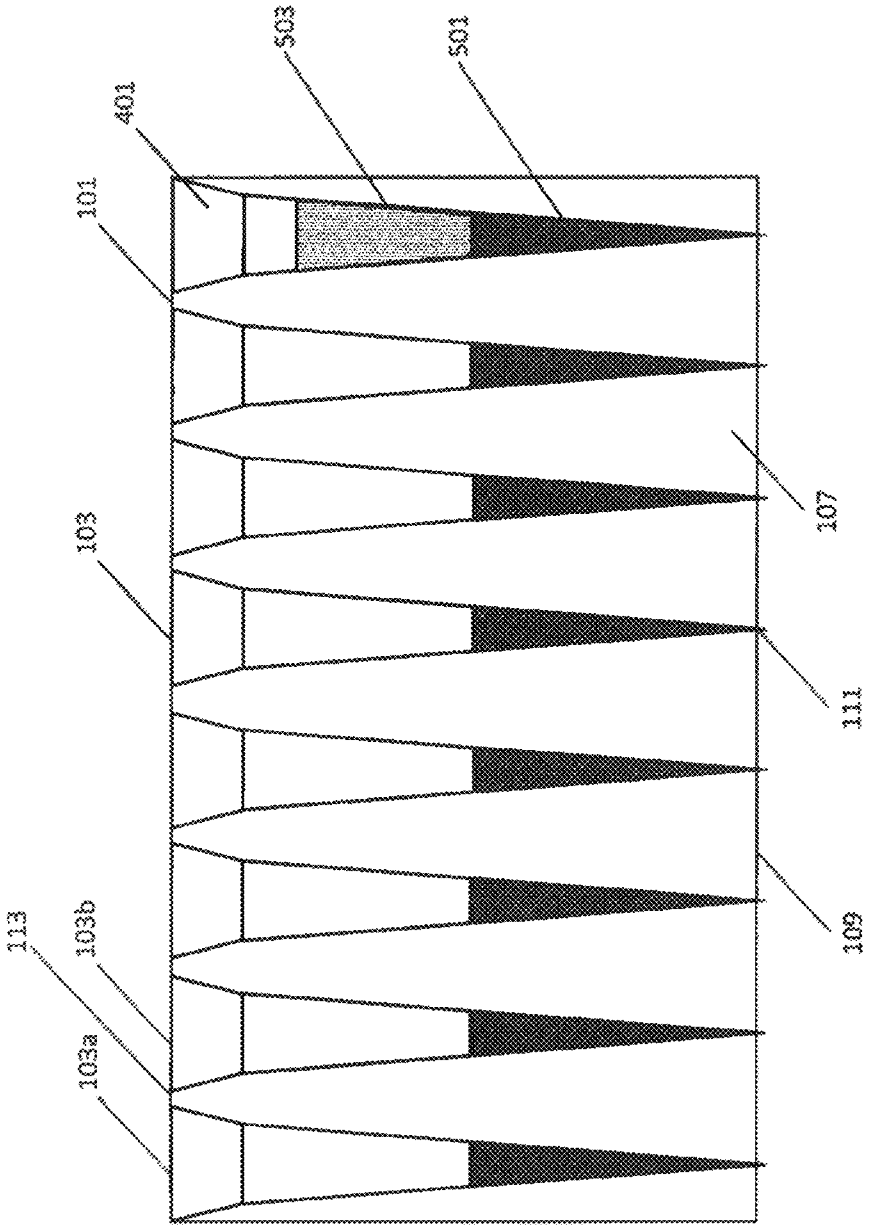
FIG. 5 is a schematic representation of an acoustic absorbing structure according to an example.

FIG. 5 is a schematic representation of an acoustic absorbing structure according to an example. In the example of FIG. 5, a material is provided within channels of the structure. Material 501, which can be an aerogel for example, is provided in the channels at a first density (presenting a first acoustic impedance). As second material 503 is provided at a second density (presenting a second acoustic impedance). The density and thus the acoustic impedance of the second material is selected to be less than that of the first material in order to provide a gradual transition in acoustic impedance from the opening of the channel. The first and second materials may be the same or different. Note that the second material is only shown in one channel in FIG. 5, although it can be provided in any number of the channels. Furthermore, it will be appreciated that multiple different layers of material or materials each presenting respective different acoustic impedances can be provided in a channel. In an example, a material or materials in a channel and the body 107 of the structure may be the same. For example, the body may be composed of the same material as materials 501, 503, but at a different (e.g., higher) density in order to present a different (e.g., higher) acoustic impedance. As such, given that the acoustic impedance of the body will be higher than that of the material(s) in the channels, an acoustic wave incident on the surface 101 will follow an acoustic pathway down a channel and be attenuated or absorbed as it does so. Put another way, an acoustic absorbing structure according to an example can comprise a monolithic structure with regions of differing acoustic impedance derived from, e.g., differences in material density.

In this connection, in an example, body 107 and/or channels 105 can comprise a porous material, such as aluminium sponge for example. The porous material can vary in density. For example, the body of the acoustic absorbing structure can comprise porous material with a first density, whilst the channels can comprise porous material with a second density which is lower than the first density and so on. So, for example, the whole acoustic absorbing structure can be composed from one material with differing densities whereby to define the channels and body regions of the structure. The material used may be the same or may differ (e.g., aluminium sponge for the body, aerogel for the channels and so on, or aluminium sponge of a first density for the body, and aluminium sponge of a second (lower) density for the channels).

Figure 6:
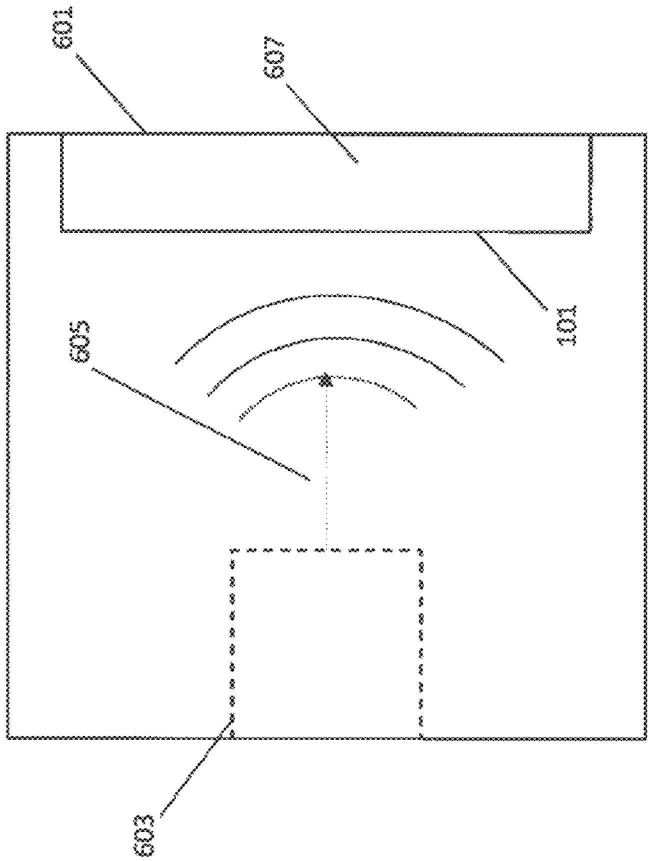
FIG. 6 is a schematic representation of a portion of a platform according to an example.

FIG. 6 is a schematic representation of a portion of a platform according to an example. The platform of FIG. 6 can be a vehicular platform, such as an aeroplane for example. Portion 601 of the platform can be part of a fuselage for example. A source of low frequency acoustic noise 603 generates an acoustic signal 605 to be absorbed or attenuated. The source 603 may be situated in the portion 601, or elsewhere in the platform. An acoustic absorbing structure 607 as described herein is provided and so configured as to absorb or attenuate the low frequency acoustic signal 605 from source 603. In an example, the acoustic absorbing structure is arranged to receive the low frequency acoustic signal 605 from the source 603 at a normal to the surface. That is, the structure is position so that the signal 605 is incident on the surface 101 such that the wavefront of the signal 605 is directly incident on the structure 607 rather than at a grazing angle (although the structure will function in such circumstances, it is most efficient when the signal is presented a normal incidence to the surface 101 in the case that the channels are arranged as depicted in the previous figures). In situations where this is not possible, the channels of the structure may be oriented such that the acoustic pathway thereof is parallel to the direction of travel of the signal 605.

As signal 605 is incident on the surface 101 of structure 607, it travels into the channels where it experiences a gradual reduction in the cross-section of the channel. Due to visco-thermal effects, the signal is thus absorbed along the length of the channel. As noted above, due to the various possible implementations in the way in which the acoustic pathways of channels may be increased without increasing a dimension (e.g., the depth, d) of the structure, the structure 607 can be effective in absorbing the sound within the portion of the platform 601 whilst taking up much less space than would otherwise be the case.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

The invention claimed is:

1. An acoustic absorbing structure, comprising:

a surface comprising an array of apertures, each aperture defining an opening for a corresponding channel, each channel forming a non-resonant acoustic attenuation structure with an axially decreasing cross-section over at least a portion of a length of the channel, wherein a channel further comprises a series of baffles arranged along its length, each baffle being parallel to the surface.

2. The acoustic absorbing structure as claimed in claim 1, wherein regions of the surface between apertures are minimised whereby to reduce acoustic impedance of the surface.

3. The acoustic absorbing structure as claimed in claim 1, wherein the apertures are polygonal.

4. The acoustic absorbing structure as claimed in claim 1, wherein the apertures form a periodic or aperiodic tessellation over the surface.

5. The acoustic absorbing structure as claimed in claim 1, wherein a channel tapers, in an axial direction, from its opening at the surface according to a predefined tapering profile.

6. The acoustic absorbing structure as claimed in claim 5, wherein a rate of tapering of the channel along its length is logarithmic.

7. The acoustic absorbing structure as claimed in claim 5, wherein the channel tapers to a point.

8. The acoustic absorbing structure as claimed in claim 5, wherein the channel tapers to an opening in a side of the acoustic absorbing structure opposite the surface.

9. The acoustic absorbing structure as claimed in claim 1, wherein a channel defines an acoustic pathway, the length of which is longer than a dimension of the acoustic absorbing structure.

10. The acoustic absorbing structure as claimed in claim 1, wherein a channel is folded.

11. The acoustic absorbing structure as claimed in claim 1, wherein the baffles have a profile matching a profile of an interior wall defining the channel.

12. The acoustic absorbing structure as claimed in claim 1, wherein each baffle extends inwardly from an inner surface of the channel and wherein the length and density of baffles increases along the length of the channel.

13. The acoustic absorbing structure as claimed in claim 1, wherein an opening defines a contraction region between the surface of the structure and a channel.

14. The acoustic absorbing structure as claimed in claim 1, further comprising a first material disposed or otherwise provided within a channel, the first material having a first density presenting a first acoustic impedance.

15. The acoustic absorbing structure as claimed in claim 14, further comprising a second material disposed or otherwise provided within the channel, the second material having a second density presenting a second acoustic impedance.

16. The acoustic absorbing structure as claimed in claim 1, wherein the structure is composed of a single material with multiple regions of respective different densities.

17. A platform comprising a source of low frequency acoustic noise, the platform comprising an acoustic absorbing structure so configured as to absorb or attenuate low frequency acoustic noise, the acoustic absorbing structure comprising:

a surface comprising an array of apertures, each aperture defining an opening for a corresponding channel, each channel forming a non-resonant acoustic attenuation structure with an axially decreasing cross-section over at least a portion of a length of the channel, wherein a channel further comprises a series of baffles arranged along its length, each baffle being parallel to the surface.

18. The platform as claimed in claim 17, wherein the acoustic absorbing structure is arranged to receive the low frequency acoustic noise from the source at a normal to the surface.

19. An acoustic absorbing structure, comprising:

a surface comprising an array of apertures, each aperture defining an opening for a corresponding channel, each channel forming a non-resonant acoustic attenuation structure with an axially decreasing cross-section over at least a portion of a length of the channel, where the structure is composed of a single material with multiple regions of respective different densities.

20. The platform as claimed in claim 17, wherein the low frequency includes 200 Hz and the acoustic absorbing structure so configured as to absorb or attenuate low frequency acoustic noise with a height of less than 300 mm.

* * * * *